United States Patent
Kim et al.

(10) Patent No.: US 11,634,023 B2
(45) Date of Patent: Apr. 25, 2023

(54) ACTIVE DUAL ROLL SHUTTER APPARATUS FOR A VEHICLE

(71) Applicants: HYUNDAI MOTOR COMPANY, Seoul (KR); KIA CORPORATION, Seoul (KR)

(72) Inventors: Un Tae Kim, Gwangmyeong-si (KR); Jun Sik Shin, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/702,543

(22) Filed: Mar. 23, 2022

(65) Prior Publication Data
US 2022/0410695 A1 Dec. 29, 2022

(30) Foreign Application Priority Data
Jun. 29, 2021 (KR) .................. 10-2021-0085135

(51) Int. Cl.
*B60K 11/08* (2006.01)
*F01P 7/10* (2006.01)

(52) U.S. Cl.
CPC .............. *B60K 11/085* (2013.01); *F01P 7/10* (2013.01)

(58) Field of Classification Search
CPC .................................. B60K 11/085; F01P 7/10
See application file for complete search history.

(56) References Cited

U.S. PATENT DOCUMENTS

| | | | |
|---|---|---|---|
| 3,759,056 A * | 9/1973 | Graber | B60K 11/085 |
| | | | 62/181 |
| 3,845,700 A * | 11/1974 | Lefeuvre | B60H 1/00764 |
| | | | 454/75 |
| 8,302,714 B2 | 11/2012 | Charnesky et al. | |
| 8,627,911 B2 | 1/2014 | Tregnago et al. | |
| 10,479,193 B2 | 11/2019 | Shimizu | |
| 2010/0139583 A1* | 6/2010 | Klotz | B60K 11/085 |
| | | | 123/41.04 |
| 2017/0334284 A1 | 11/2017 | Drozdowski et al. | |
| 2020/0156461 A1* | 5/2020 | Droulez | B60K 11/085 |

FOREIGN PATENT DOCUMENTS

| | | |
|---|---|---|
| CN | 209115026 U | 7/2019 |
| DE | 202017102954 U1 | 6/2017 |
| KR | 20120113956 A | 10/2012 |
| KR | 101509787 B1 | 4/2015 |

* cited by examiner

*Primary Examiner* — Long T Tran
(74) *Attorney, Agent, or Firm* — Lempia Summerfield Katz LLC

(57) ABSTRACT

An active dual roll shutter apparatus for a vehicle has two lead screws rotated by power from a single motor. First and second roll screens are simultaneously operated upward and downward in opposite directions along the two lead screws to open a flow path when the lead screws rotate, thereby improving sealability of the flow path and aerodynamic performance of the vehicle.

12 Claims, 9 Drawing Sheets

ACTIVE DUAL ROLL SHUTTER APPARATUS FOR A VEHICLE

CROSS REFERENCE TO RELATED APPLICATION

The present application claims priority to Korean Patent Application No. 10-2021-0085135, filed Jun. 29, 2021, the entire contents of which are incorporated herein for all purposes by this reference.

BACKGROUND

Field of the Disclosure

The present disclosure relates to an active dual roll shutter apparatus for a vehicle, and more particularly, to a technology related to an active dual roll shutter apparatus for a vehicle, which operates to open or close a grill of a vehicle using two roll screens that are simultaneously operated in an upward/downward direction by a single motor.

Description of the Related Art

To improve fuel economy, it is important to not only minimize air resistance by streamlining external design of a vehicle, but also to provide a technology for controlling a flow in an engine compartment.

In general, a grill is applied to a front bumper or above a front bumper of a vehicle to allow air to smoothly pass through the grill to cool the engine compartment. However, the fuel economy tends to deteriorate when the amount of air introduced into the engine compartment increases and thus air resistance becomes severe.

Therefore, a technology is used that prevents air from entering the engine compartment by closing holes of the grill in the front of the vehicle except for situations in which the engine needs to be cooled. An active air flap (AAF) is a component serving as a valve that may open or close the holes of the grill in accordance with a preset condition.

In the case of the active air flap in the related art, a plurality of flaps is simultaneously operated by an operation of an actuator to open or close a flow path. The structure using the plurality of flaps has an inherent problem in that air leaks through a gap between the flaps. This causes a deterioration in effect of improving an aerodynamic force (e.g., minimizing air resistance).

Recently, technologies have been developed that use a roll screen, instead of the flap, as a solution for improving an aerodynamic effect (e.g., minimizing air resistance) by improving sealability. However, because a single roll screen is used to open or close the flow path, there is a problem in that a considerable amount of time is required to open or close the roll screen.

If a temperature of a coolant increases and the flow path is not immediately opened at a point in time at which cooling is required, thermal damage may occur and/or durability of the engine may severely deteriorate. Further, unless the flow path is immediately closed at a point in time at which the aerodynamic force is required to be improved, the effect of improving the aerodynamic force, i.e., reducing air resistance, deteriorates.

Therefore, the structure configured to open or close the flow path using the single roll screen has a problem in that a large amount of time is required to open or close the roll screen. This causes a deterioration in effect of cooling the engine compartment and improving the aerodynamic force, i.e., reducing air resistance.

A motor may be used that operates at a high speed to increase an operating speed of the roll screen. However, in this case, the increase in capacity of the motor may increase the unit price and may cause a new problem in that the roll screen is torn or operating components are damaged when the roll screen is caught by foreign objects or the like while moving at a high speed.

The foregoing explained as the background is intended merely to aid in understanding the background of the present disclosure. The foregoing is not intended to mean that the present disclosure falls within the purview of the related art that is already known to those of ordinary skill in the art.

SUMMARY

The present disclosure is proposed to solve these problems and to provide an active dual roll shutter apparatus for a vehicle, which opens or closes a flow path of a front grill using two roll screens that are simultaneously operated in an upward/downward direction by a single motor. The present disclosure also aims to increase an effect of improving an aerodynamic force, i.e., reducing wind or air resistance, by improving sealability for a flow path in comparison with a structure using a plurality of flaps. The present disclosure also aims to minimize an increase in cost and to improve durability of components by greatly reducing the amount of time required to open or close a flow path without using a motor that operates at a high speed.

To achieve the above objects, an active dual roll shutter apparatus for a vehicle according to an embodiment of the present disclosure is provided. The shutter apparatus includes two lead screws, each having a first screw thread and a second screw thread formed in opposite directions from one end and the other end thereof to a middle point thereof in a longitudinal direction. The shutter apparatus also includes a motor configured to generate power for rotating the lead screws and first and second roll screens respectively coupled to the first and second screw threads. The first and second roll screens are configured to simultaneously move in opposite directions along first and second screw threads when the lead screws rotate, to close a flow path when meeting together at the middle points of the lead screws, and to open the flow path when moving in the opposite directions from the middle points of the lead screws.

The active dual roll shutter apparatus may further include a body housing configured to allow the lead screws to be rotatably coupled thereto, having the flow path through which air passes, and fixedly installed on a grill part of a front of a vehicle, such as in or above a front bumper.

The two lead screws may be respectively provided and installed at left and right sides of the body housing and extend upward and downward. The single motor may be provided and fixedly installed on the body housing. The active dual roll shutter apparatus may further include a power transmission mechanism configured to connect the motor and the two lead screws so that the two lead screws are simultaneously rotated by the power of the single motor.

The power transmission mechanism may include: two lead screw gears each integrally provided at one end of each of the lead screws; two intermediate gears respectively engaging with the lead screw gears; a connection shaft configured to connect the two intermediate gears; and a motor gear coupled to the motor and engaging with any one of the two intermediate gears.

The active dual roll shutter apparatus may further include: a first roller bar around which one end of the first roll screen is wound; a first roller pin configured to penetrate the first roller bar, having two opposite ends fixed to the body housing, and serving as a rotation center of the first roller bar; and a first screen bar coupled to the other end of the first roll screen and having first screw holes coupled to the first screw threads of the lead screws.

The active dual roll shutter apparatus may further include first coil springs each having two opposite ends coupled to the first roller bar and the first roller pin and configured to provide an elastic force to enable the first roller bar to rotate. The first coil springs may be configured to provide the elastic force to the first roller bar so that the first roll screen is wound around the first roller bar.

The active dual roll shutter apparatus may further include: a second roller bar around which one end of the second roll screen is wound; a second roller pin configured to penetrate the second roller bar, having two opposite ends fixed to the body housing, and serving as a rotation center of the second roller bar; and a second screen bar coupled to the other end of the second roll screen and having second screw holes coupled to the second screw threads of the lead screws.

The active dual roll shutter apparatus may further include second coil springs each having two opposite ends coupled to the second roller bar and the second roller pin and configured to provide an elastic force to enable the second roller bar to rotate. The second coil springs may be configured to provide the elastic force to the second roller bar so that the second roll screen is wound around the second roller bar.

The first coil springs and the second coil springs may provide the same elastic force.

When the first screen bar and the second screen bar meet together and come into contact with each other at the middle points of the lead screws, the first roll screen and the second roll screen may be simultaneously unwound to close the flow path. When the first screen bar and the second screen bar move upward and downward in the state in which the flow path is closed, the first roll screen and the second roll screen may be simultaneously and respectively wound around the first roller bar and the second roller bar to open the flow path.

When the first screen bar and the second screen bar meet together and come into contact with each other at the middle points of the lead screws, the first roll screen and the second roll screen may be simultaneously unwound to close the flow path. Pad members may be respectively coupled to surfaces of the first and second screen bars, which come into contact with each other, such that the pad members come into contact with each other to improve sealability of the flow path.

The lead screws may extend upward and downward, i.e., generally vertically, and the first and second roll screens may open or close the flow path while moving in an upward/downward direction in the longitudinal direction of the lead screws.

According to the active dual roll shutter apparatus of the present disclosure, the first and second roll screens are simultaneously operated upward and downward in opposite directions by the power of the single motor to open or close the flow path, which makes it possible to improve sealability of the flow path and improve aerodynamic performance of the vehicle in comparison with a structure of an active air flap in the related art in which a plurality of flaps is used to open or close a flow path.

In addition, according to the active dual roll shutter apparatus of the present disclosure, the first and second roll screens are simultaneously operated to open or close the flow path. Therefore, it is possible to significantly reduce the time required to open or close the flow path without using a motor that operates at a high speed. As a result, it is possible to minimize an increase in costs and improve durability of the components.

In addition, according to the present disclosure, the first and second roll screens each having a small cross-sectional thickness may be used to open or close the flow path. As a result, it is possible to significantly reduce a thickness of the active dual roll shutter apparatus in the forward/rearward direction of the vehicle, thereby reducing a volume and weight of the active dual roll shutter apparatus.

DETAILED DESCRIPTION

Figure 1:
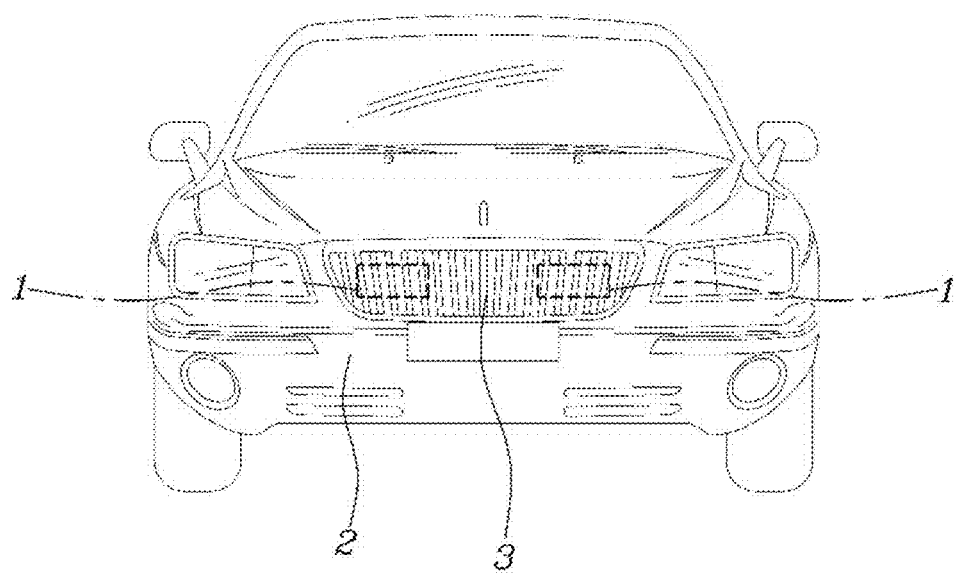
FIG. 1 is a front view illustrating a vehicle having a front bumper and a grill part on which an active dual roll shutter apparatus according to the present disclosure is mounted.
Figure 2:
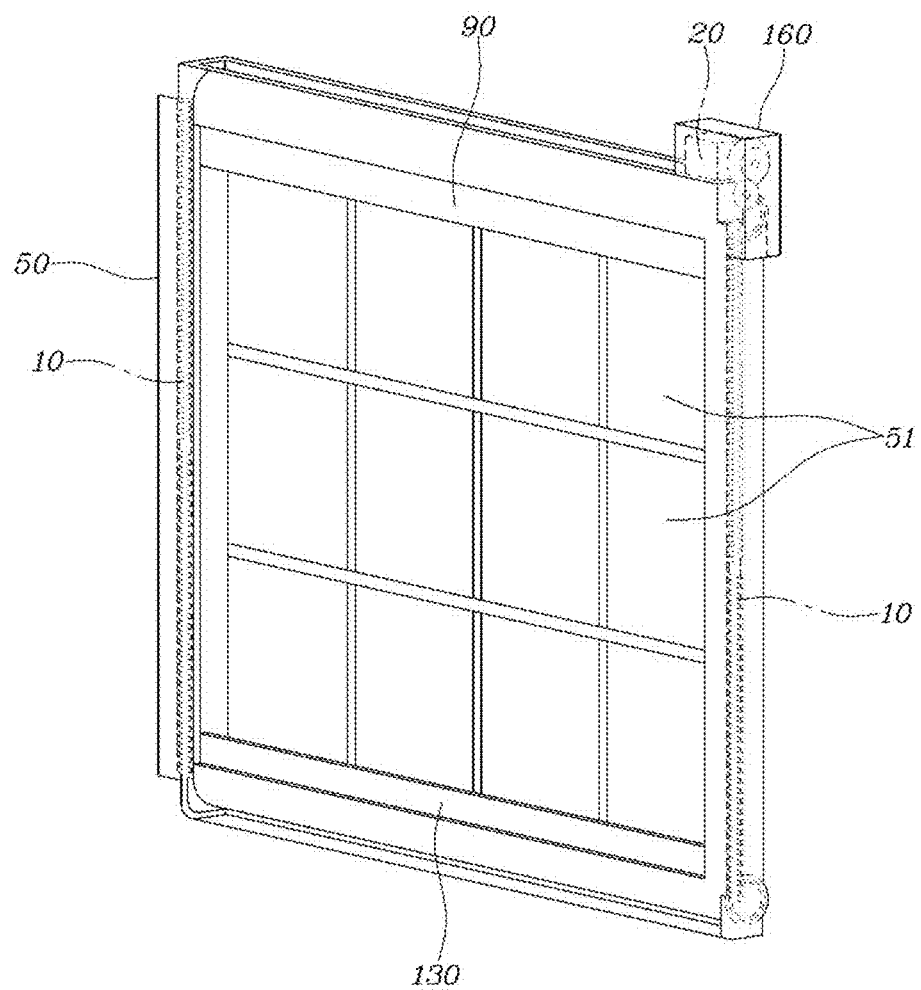
FIGS. 2 and 3 are views illustrating a closed state and an opened state of a flow path made by an operation of the active dual roll shutter apparatus according to the present disclosure.
Figure 3:
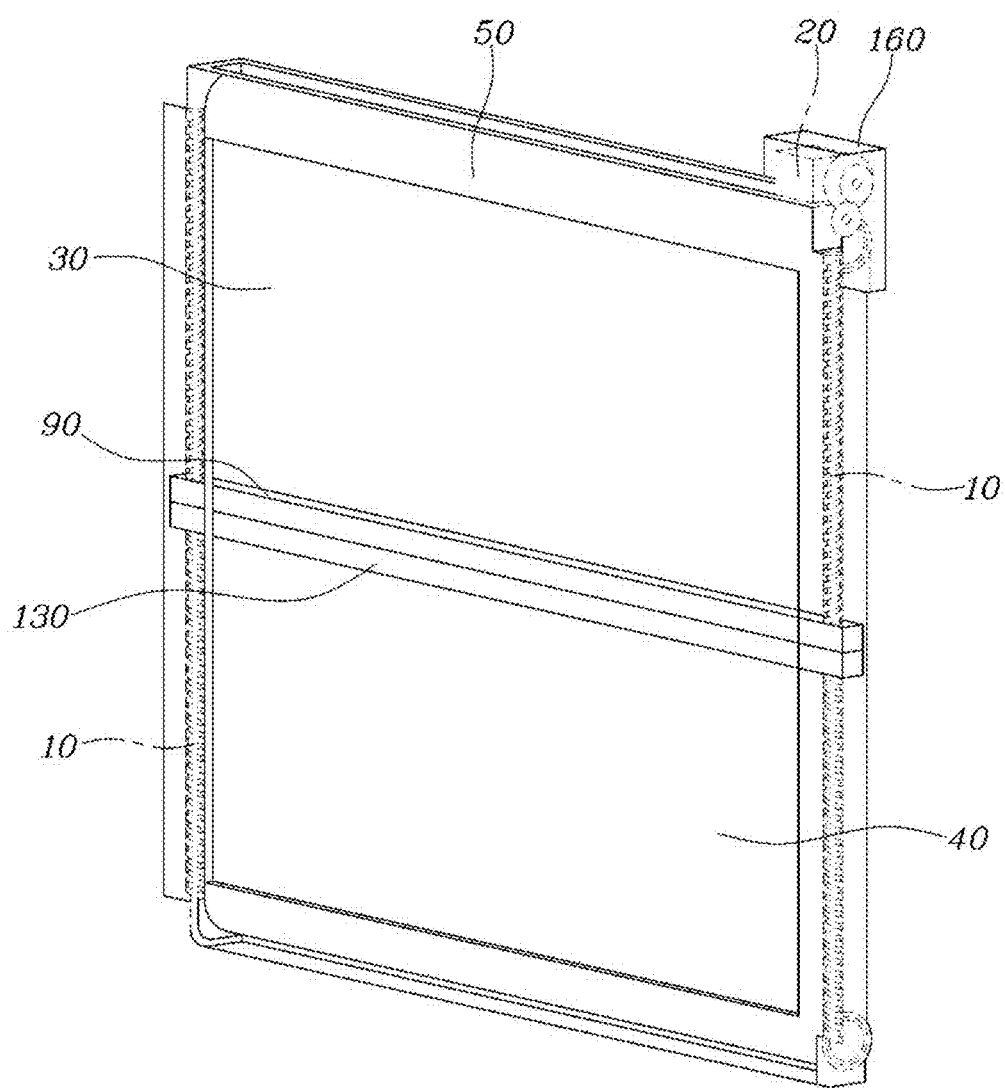
Figure 4:
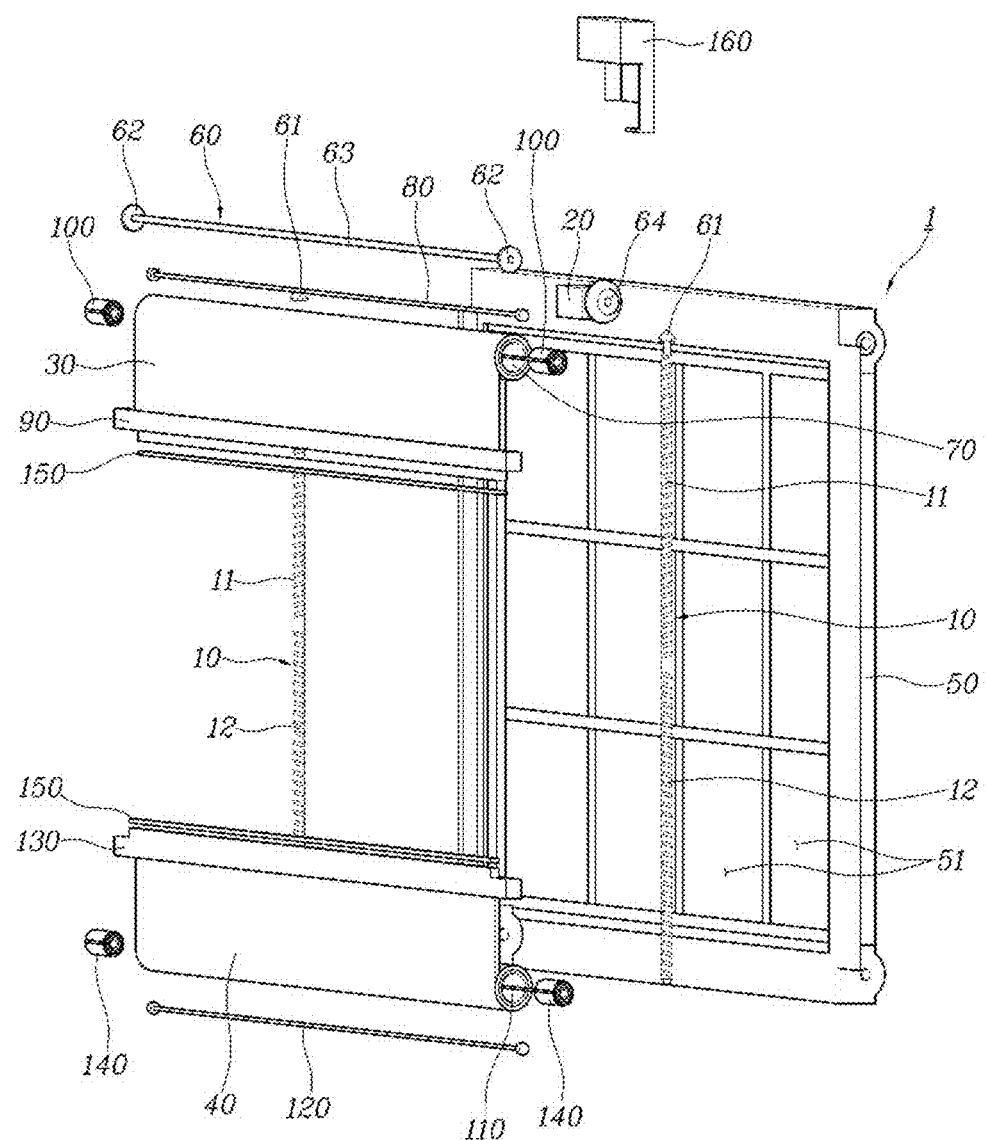
FIG. 4 is an exploded view of the active dual roll shutter apparatus according to the present disclosure.
Figure 5:
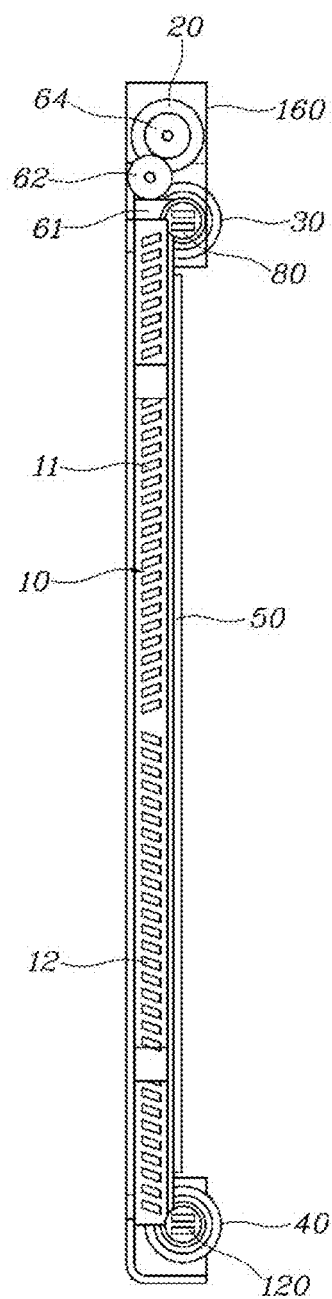
FIG. 5 is a side view illustrating a state in which the components illustrated in FIG. 4 are coupled.
Figure 6:
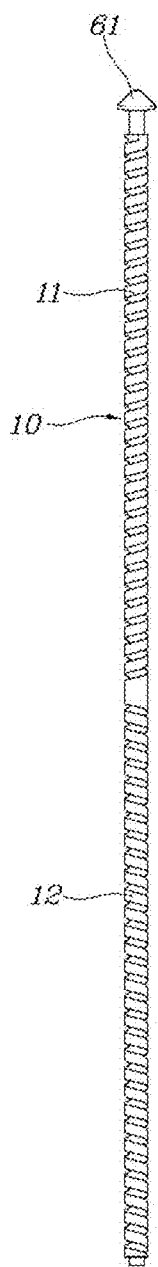
FIG. 6 is a view illustrating a lead screw having a first screw thread and a second screw thread according to the present disclosure.
Figure 7:
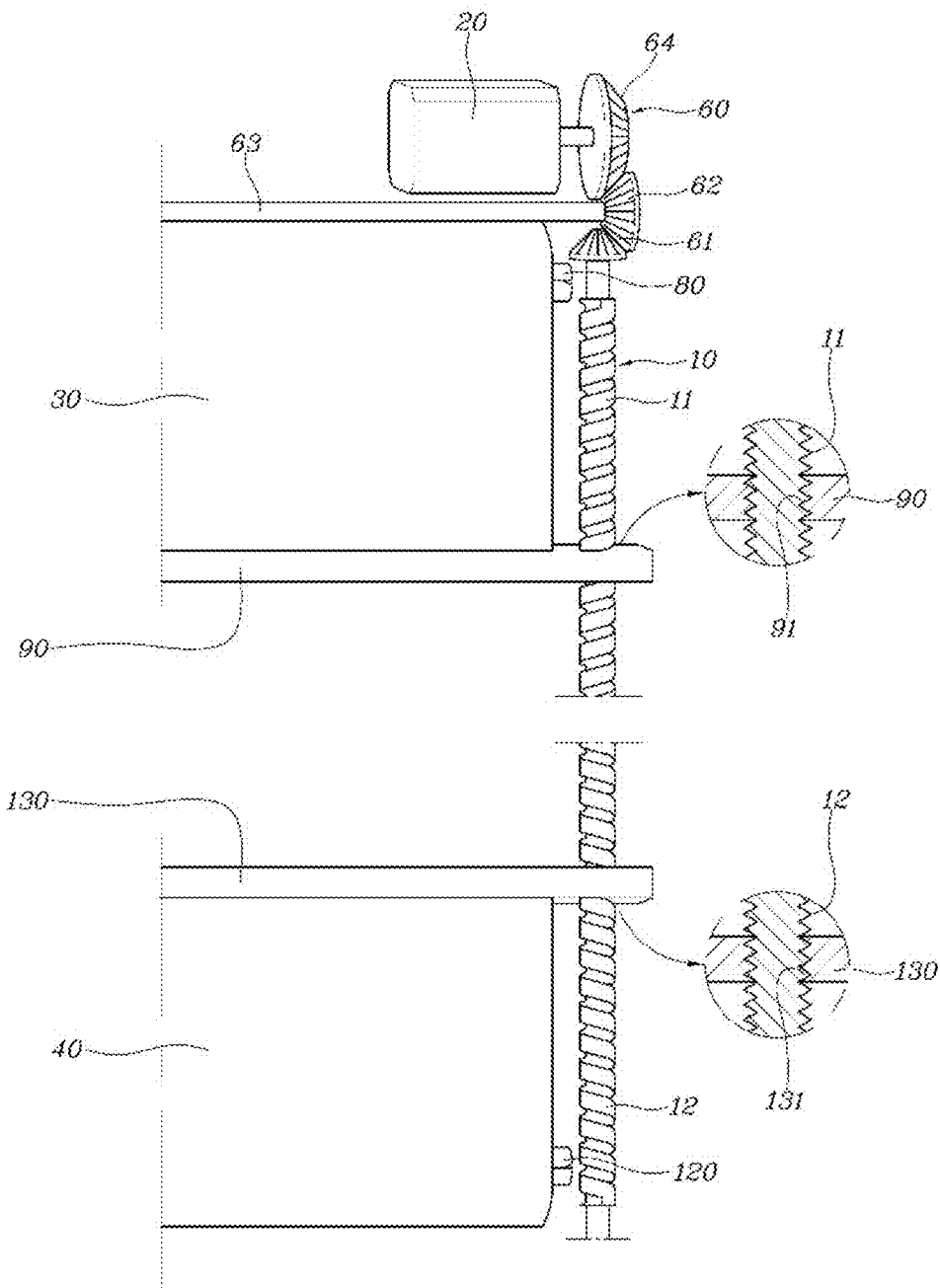
FIGS. 7-9 are views for explaining components except for a body housing of the active dual roll shutter apparatus according to the present disclosure.
Figure 8:
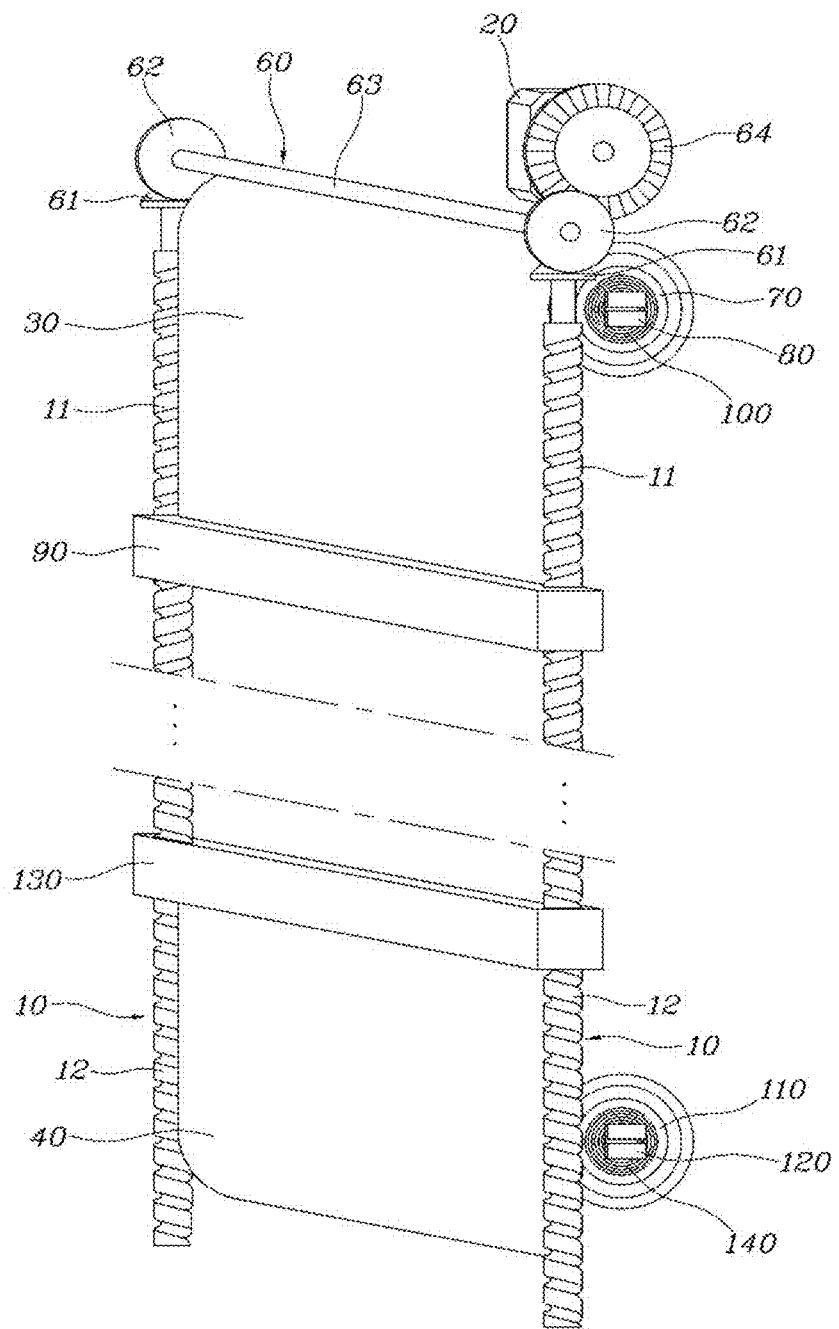
Figure 9:
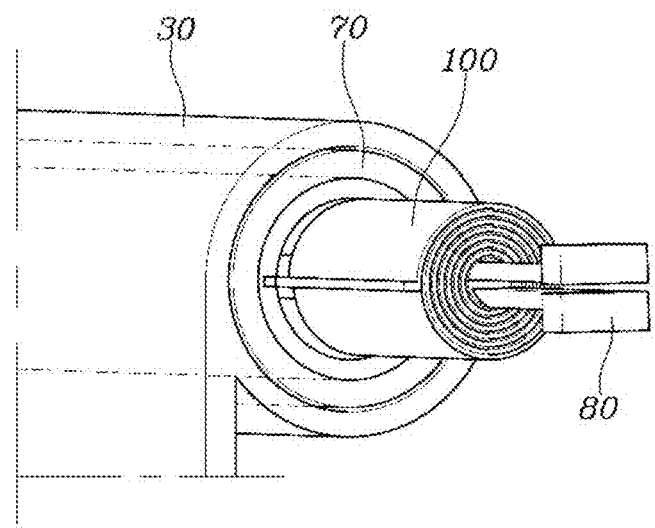
Figure 9:
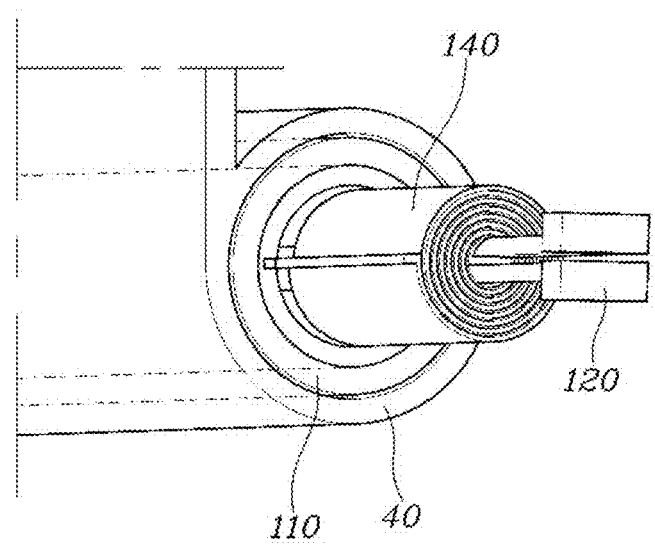

Specific structural or functional descriptions of embodiments of the present disclosure that are described in this specification or application are exemplified only for the purpose of explaining the embodiments according to the present disclosure. The embodiments according to the present disclosure may be carried out in various forms. It should not be interpreted that the present disclosure is limited to the embodiments described in this specification or application.

Because the embodiments according to the present disclosure may be variously changed and may have various forms, specific embodiments are illustrated in the drawings and described in detail in the present specification or application. However, the descriptions of the specific embodiments are not intended to limit embodiments according to the concept of the present disclosure to the specific embodiments. It should be understood that the present disclosure covers all modifications, equivalents, and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, for example, such as "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present disclosure. Singular expressions include plural expressions unless clearly described as having different meanings in the context of the disclosure. In the present specification, it should be understood that the terms "comprises," "comprising," "includes," "including," "containing," "has," "having" or other variations thereof are inclusive and therefore specify the presence of stated features, numbers, steps, operations, elements, components, or combinations thereof. Such terms do not preclude the presence or addition of one or more other features, numbers, steps, operations, elements, components, or combinations thereof.

Unless otherwise defined, all terms used herein, including technical or scientific terms, have the same meaning as commonly understood by those of ordinary skill in the art to which the present disclosure pertains. The terms such as those defined in a commonly used dictionary should be interpreted as having meanings consistent with meanings in the context of related technologies and should not be interpreted as ideal or having excessively formal meanings unless explicitly defined in the present specification. When a component, device, element, or the like of the present disclosure is described as having a purpose or performing an operation, function, or the like, the component, device, or element should be considered herein as being "configured to" meet that purpose or perform that operation or function.

A control unit (controller) according to an embodiment of the present disclosure may be implemented by a non-volatile memory (not illustrated) configured to apply an algorithm for controlling operations of various constituent elements in a vehicle or store data related to software commands for executing the algorithm. The control unit (controller) may also be implemented by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, an active dual roll shutter apparatus for a vehicle according to an embodiment of the present disclosure is described with reference to the accompanying drawings.

As illustrated in FIG. 1, an active dual roll shutter apparatus 1 for a vehicle according to the present disclosure is mounted and operates to open or close a flow path in a grill part 3 of a front of the vehicle, in this case above a front bumper 2 and is configured to allow air to pass therethrough.

As illustrated in FIGS. 1-9, the active dual roll shutter apparatus 1 for a vehicle according to the present disclosure includes lead screws 10 (in one example, two lead screws), each having a first screw thread 11 and a second screw thread 12 formed in opposite directions from one end (i.e., a first end) and the other end (i.e., a second end) thereof to a middle point thereof in a longitudinal direction, i.e., along a length of the lead screws 10. The active dual roll shutter apparatus 1 also includes a motor 20 configured to generate power for rotating the lead screws 10 and first and second roll screens 30 and 40 respectively coupled to the first and second screw threads 11 and 12. The first and second roll screens 30 and 40 are configured to simultaneously move in opposite directions along the first and second screw threads 11 and 12 when the lead screws 10 rotate, to close the flow path 51 when meeting together at the middle points of the lead screws 10, and to open the flow path when moving in opposite directions from the middle points of the lead screws 10. The active dual roll shutter apparatus 1 also includes a body housing 50 configured to allow the lead screws 10 to be rotatably coupled thereto, having the flow path 51 through which the air passes, and fixedly installed on the grill part 3 above the front bumper 2.

The first screw thread 11 provided in the form of a right-handed screw thread is formed along an upper side of the middle point in the longitudinal direction of (i.e., along the length of) the lead screw 10. The second screw thread 12 provided in the form of a left-handed screw thread is formed along a lower side of the middle point.

The motor 20 may be, but is not limited to, a rotational stepping motor that rotates when operating and is fixed to not rotate when not operating. The motor 20 is electrically connected to a power source and is operated under the control of a controller (control unit). Signals input to the controller from sensors include a signal from a vehicle speed sensor, a signal from an engine temperature sensor, and a signal from a coolant temperature sensor.

The first and second roll screens 30 and 40 may each be made of plastic, metal, synthetic resin, non-woven fabrics, or the like. The roll screens 30 and 40 may have a degree of flexibility to permit the screens to roll up and to unroll.

Two lead screws 10 may be provided. The lead screws 10 are respectively installed at left and right sides of the body housing 50 and extend upward and downward, i.e., generally vertically.

The single motor 20 is provided and fixedly installed at one side of an upper end of the body housing 50.

According to an embodiment of the present disclosure, the first and second roll screens 30 and 40 are simultaneously operated by power of the single motor 20 to open or close the flow path 51. The active dual roll shutter apparatus may further include a power transmission mechanism 60 configured to connect the motor 20 and the two lead screws 10 so that the two lead screws 10 may be simultaneously rotated by the power of the single motor 20.

The power transmission mechanism 60, which simultaneously connects the single motor 20 and the two lead screws 10, includes: two lead screw gears 61, each integrally provided at one end (i.e., an upper end) of each of the lead screws 10; two intermediate gears 62 respectively engaging with the lead screw gears 61; a connection shaft 63 configured to connect the two intermediate gears 62; and a motor gear 64 coupled to the motor 20 and engaging with any one of the two intermediate gears 62.

The power transmission mechanism 60 is configured to transmit the power of the motor 20 to the lead screws 10 and to be installed and provided only at the upper end of the body housing 50 at which the motor 20 is installed.

According to an embodiment of the present disclosure, the first and second roll screens 30 and 40 are simultaneously operated by the power of the single motor 20 to open or close the flow path 51. To this end, the active dual roll shutter apparatus 1 further includes: a first roller bar 70 around which one end (i.e., an upper end) of the first roll screen 30 is wound; a first roller pin 80 configured to penetrate the first roller bar 70, having two opposite ends fixed to the body housing 50, and serving as a rotation center of the first roller bar 7; a first screen bar 90 coupled to the other end (i.e., a lower end) of the first roll screen 30 and having first screw holes 91 coupled to the first screw threads 11 of the lead screws 10; and first coil springs 100 each having two opposite ends coupled to the first roller bar 70 and the first roller pin 80 and configured to provide an elastic force to enable the first roller bar 70 to rotate. The first coil springs 100 are configured to provide the elastic force to the first roller bar 70 so that the first roll screen 30 is wound around the first roller bar 70.

The first screw threads 11 of the lead screws 10 are penetratively coupled to the first screw holes 91 of the first screen bar 90. When the lead screws 10 are rotated by the motor 20, the first screen bar 90 moves along the first screw threads 11 of the lead screws 10. In this case, the first roll screen 30 is wound around the first roller bar 70 or unwound from the first roller bar 70.

Two first coil springs 100 may be provided. One first coil spring 100 is installed such that two opposite ends thereof are coupled to one end of the first roller bar 70 and one end of the first roller pin 80. The other first coil spring 100 is installed such that two opposite ends thereof are coupled to the other end of the first roller bar 70 and the other end of the first roller pin 80.

When the first roll screen 30 is unwound from the first roller bar 70, the first roll screen 30 may be kept tensely unwound (e.g., taught) by the elastic force of the first coil springs 100.

Further, according to an embodiment of the present disclosure, the active dual roll shutter apparatus further includes: a second roller bar 110 around which one end (i.e., a lower end) of the second roll screen 40 is wound; a second roller pin 120 configured to penetrate the second roller bar 110, having two opposite ends fixed to the body housing 50, and serving as a rotation center of the second roller bar 110; a second screen bar 130 coupled to the other end (i.e., an upper end) of the second roll screen 120 and having second screw holes 131 coupled to the second screw threads 12 of the lead screws 10; and second coil springs 140 each having two opposite ends coupled to the second roller bar 110 and the second roller pin 120 and configured to provide an elastic force to enable the second roller bar 110 to rotate. The second coil springs 140 are configured to provide the elastic force to the second roller bar 110 so that the second roll screen 40 is wound around the second roller bar 110.

The second screw threads 12 of the lead screws 10 are penetratively coupled to the second screw holes 131 of the second screen bar 130. When the lead screws 10 are rotated by the power of the motor 20, the second screen bar 130 moves along the second screw threads 12 of the lead screws 10. In this case, the second roll screen 40 is wound around the second roller bar 110 or unwound from the second roller bar 110.

Two second coil springs 140 may be provided. One second coil spring 140 is installed such that two opposite ends thereof are coupled to one end of the second roller bar 110 and one end of the second roller pin 120. The other second coil spring 140 is installed such that two opposite ends thereof are coupled to the other end of the second roller bar 110 and the other end of the second roller pin 120.

When the second roll screen 40 is unwound from the second roller bar 110, the second roll screen 40 may be kept tensely unwound (e.g., taught) by the elastic force of the second coil springs 140.

According to the present disclosure, the first coil spring 100 and the second coil spring 140 provide the same elastic force. Therefore, the first roll screen 30 and the second roll screen 40 may operate at the same speed.

According to an embodiment of the present disclosure, when the first screen bar 90 and the second screen bar 130 meet together and come into contact with each other at the middle points of the lead screws 10 by the operation of the single motor 20, the first roll screen 30 and the second roll screen 40 are simultaneously unwound to close the flow path 51. When the first screen bar 90 and the second screen bar 130 move upward and downward in the state in which the flow path 51 is closed, the first roll screen 30 and the second roll screen 40 are simultaneously and respectively wound around the first roller bar 70 and the second roller bar 110 to open the flow path 51. To improve sealability of the flow path 51, pad members 150 are respectively coupled to surfaces of the first and second screen bars 30 and 40 which come into contact with each other, such that the pad members 150 may come into contact with each other.

The pad members 150 may be made of, but are not limited to, a rubber material having a relatively small cross-sectional thickness.

In addition, according to an embodiment of the present disclosure, the active dual roll shutter apparatus 1 may further include a cover member 160 fixed to the body housing 50 and configured to cover and protect the motor 20, the intermediate gear 62, and the lead screw gear 61.

As described above, according to the active dual roll shutter apparatus 1 according to an embodiment of the present disclosure, the first and second roll screens 30 and 40 are simultaneously operated upward and downward in opposite directions by the power of the single motor 20 to open or close the flow path 51. This makes it possible to improve sealability, i.e., closing, of the flow path 51 and improve aerodynamic performance of the vehicle in comparison with a structure of an active air flap in the related art in which a plurality of flaps is used to open or close a flow path.

In addition, according to the active dual roll shutter apparatus 1 according to the present disclosure, the first and second roll screens 30 and 40 are simultaneously operated to open or close the flow path 51. Therefore, it is possible to significantly reduce the time required to open or close the flow path without using a motor that operates at a high speed. As a result, it is possible to minimize an increase in costs and improve durability of the components.

In addition, according to the present disclosure, the first and second roll screens 30 and 40, each having a relatively small cross-sectional thickness, may be used to open or close the flow path 51. As a result, it is possible to significantly reduce a thickness of the active dual roll shutter apparatus in the forward/rearward moving direction of the vehicle, thereby reducing a volume and weight of the active dual roll shutter apparatus 1. In the disclosed embodiments, the active dual roll shutter apparatus provides selective air flow to an engine compartment of a vehicle and may installed in a front portion of the vehicle, such as in or on a front bumper of the vehicle, above the front bumper (as shown in FIG. 1), or the like. The position of the active dual roll shutter apparatus on the front of the vehicle is not intended to be limited, as long as the noted flow path is provided to the engine compartment.

While specific embodiments of the present disclosure have been illustrated and described, it should be obvious to those of ordinary skill in the art that the present disclosure may be variously modified and changed without departing from the technical spirit of the present disclosure defined in the appended claims.

What is claimed is:

1. An active dual roll shutter apparatus for a vehicle, the apparatus comprising:
   two lead screws, each having a first screw thread and a second screw thread formed in opposite directions from one end and the other end thereof to a middle point thereof in a longitudinal direction;
   a motor configured to generate power for rotating the two lead screws; and
   first and second roll screens respectively coupled to the first and second screw threads and configured to simultaneously move in opposite directions along first and second screw threads when the two lead screws rotate, to close a flow path when meeting together at the middle points of the two lead screws, and to open the flow path when moving in the opposite directions from the middle points of the lead screws.

2. The apparatus of claim 1, further comprising:
   a body housing configured to allow the two lead screws to be rotatably coupled thereto, having the flow path through which air passes, and fixedly installed on a grill part of a front of a vehicle.

3. The apparatus of claim 2, wherein the two lead screws are respectively provided and installed at left and right sides of the body housing and extend upward and downward, wherein the single motor is provided and fixedly installed on the body housing, and wherein the apparatus further comprises a power transmission mechanism configured to connect the motor and the two lead screws so that the two lead screws are simultaneously rotated by the power of the single motor.

4. The apparatus of claim 3, wherein the power transmission mechanism comprises:
   two lead screw gears each integrally provided at one end of each of the two lead screws;
   two intermediate gears respectively engaging with the two lead screw gears;
   a connection shaft configured to connect the two intermediate gears; and
   a motor gear coupled to the motor and engaging with any one of the two intermediate gears.

5. The apparatus of claim 2, further comprising:
   a first roller bar around which one end of the first roll screen is wound;
   a first roller pin configured to penetrate the first roller bar, having two opposite ends fixed to the body housing, and serving as a rotation center of the first roller bar; and
   a first screen bar coupled to the other end of the first roll screen and having first screw holes coupled to the first screw threads of the lead screws.

6. The apparatus of claim 5, further comprising:
   two first coil springs, each having two opposite ends coupled to the first roller bar and the first roller pin and configured to provide an elastic force to enable the first roller bar to rotate, wherein the first coil springs are configured to provide the elastic force to the first roller bar so that the first roll screen is wound around the first roller bar.

7. The apparatus of claim 6, further comprising:
   a second roller bar around which one end of the second roll screen is wound;
   a second roller pin configured to penetrate the second roller bar, having two opposite ends fixed to the body housing, and serving as a rotation center of the second roller bar; and
   a second screen bar coupled to the other end of the second roll screen and having second screw holes coupled to the second screw threads of the lead screws.

8. The apparatus of claim 7, further comprising:
   two second coil springs, each having two opposite ends coupled to the second roller bar and the second roller pin and configured to provide an elastic force to enable the second roller bar to rotate, wherein the second coil springs are configured to provide the elastic force to the second roller bar so that the second roll screen is wound around the second roller bar.

9. The apparatus of claim 8, wherein the first coil springs and the second coil springs provide the same elastic force.

10. The apparatus of claim 7, wherein, when the first screen bar and the second screen bar meet together and come into contact with each other at the middle points of the two lead screws, the first roll screen and the second roll screen are simultaneously unwound to close the flow path, and
   wherein, when the first screen bar and the second screen bar move upward and downward in the state in which the flow path is closed, the first roll screen and the second roll screen are simultaneously and respectively wound around the first roller bar and the second roller bar to open the flow path.

11. The apparatus of claim 7, wherein, when the first screen bar and the second screen bar meet together and come into contact with each other at the middle points of the two lead screws, the first roll screen and the second roll screen are simultaneously unwound to close the flow path, and
   wherein pad members are respectively coupled to surfaces of the first and second screen bars, which come into contact with each other, such that the pad members come into contact with each other to seal the flow path.

12. The apparatus of claim 1, wherein the two lead screws extend upward and downward, and wherein the first and second roll screens open or close the flow path while moving in an upward and/or downward direction in the longitudinal direction of the two lead screws.

* * * * *